(12) United States Patent
Nakagawa

(10) Patent No.: US 9,753,444 B2
(45) Date of Patent: Sep. 5, 2017

(54) PROGRAMMABLE CONTROLLER, PROGRAMMABLE CONTROLLER SYSTEM, AND METHOD OF CREATING EXECUTION ERROR INFORMATION

(71) Applicant: Tetsushi Nakagawa, Nagoya (JP)

(72) Inventor: Tetsushi Nakagawa, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 270 days.

(21) Appl. No.: 14/758,308

(22) PCT Filed: Mar. 6, 2013

(86) PCT No.: PCT/JP2013/056172
§ 371 (c)(1),
(2) Date: Jun. 29, 2015

(87) PCT Pub. No.: WO2014/136228
PCT Pub. Date: Sep. 12, 2014

(65) Prior Publication Data
US 2015/0355616 A1     Dec. 10, 2015

(51) Int. Cl.
*G05B 19/042* (2006.01)
*G05B 19/05* (2006.01)
(Continued)

(52) U.S. Cl.
CPC ........... *G05B 19/042* (2013.01); *G05B 19/05* (2013.01); *G06F 11/0706* (2013.01);
(Continued)

(58) Field of Classification Search
None
See application file for complete search history.

(56) References Cited

U.S. PATENT DOCUMENTS 4,755,997 A     7/1988 Takahashi
5,222,220 A *   6/1993 Mehta .................. G06F 11/0721
                                                        712/227
(Continued)

FOREIGN PATENT DOCUMENTS

EP     1724650 B1     5/2010
JP     61-224048 A    10/1986
(Continued)

OTHER PUBLICATIONS

Communication dated May 9, 2016, issued by the German Patent Office in counterpart German application No. 112013006686.6.
(Continued)

*Primary Examiner* — Ryan Jarrett
(74) *Attorney, Agent, or Firm* — Sughrue Mion, PLLC; Richard C. Turner

(57) ABSTRACT

A control program execution unit, when a callee control program is called, stores a return address in a stack and stores input data for the callee control program in a data storage unit. An execution error information management unit, when an execution error occurs, acquires execution error information that includes the return address stored in the stack, the input data stored in the data storage unit, and a program name that corresponds to the return address and is obtained by using mapping information that indicates the storing positions of a control program and the callee control program in a user program storage unit.

11 Claims, 5 Drawing Sheets

(51) Int. Cl.
*G06F 11/07* (2006.01)
*G06F 11/32* (2006.01)

(52) U.S. Cl.
CPC ........ *G06F 11/0766* (2013.01); *G06F 11/327* (2013.01); *G05B 2219/23011* (2013.01)

(56) References Cited

U.S. PATENT DOCUMENTS

| | | | |
|---|---|---|---|
| 5,844,795 A | 12/1998 | Johnston et al. | |
| 6,618,635 B1 | 9/2003 | Beck et al. | |
| 2006/0161739 A1* | 7/2006 | Genty | G06F 12/1466 711/152 |
| 2006/0225135 A1* | 10/2006 | Cheng | G06F 12/145 726/26 |
| 2011/0145662 A1* | 6/2011 | Yuan | G06F 11/0715 714/57 |
| 2013/0212682 A1* | 8/2013 | McClure | G06F 21/577 726/25 |

FOREIGN PATENT DOCUMENTS

| | | |
|---|---|---|
| JP | 04-215106 A | 8/1992 |
| JP | 04-336631 A | 11/1992 |
| JP | 10-289110 A | 10/1998 |
| JP | 2002-507303 A | 3/2002 |
| JP | 2004-021614 A | 1/2004 |
| JP | 2004-287869 A | 10/2004 |
| JP | 2007-304939 A | 11/2007 |
| JP | 2010-238232 A | 10/2010 |
| JP | 2011-175353 A | 9/2011 |

OTHER PUBLICATIONS

Notice of Reasons for Refusal dated Aug. 29, 2013.
Notice of Reasons for Refusal dated Oct. 31, 2013.
Notice of Rejection dated Dec. 15, 2014.
International Search Report for PCT/JP2013/056172 dated Apr. 23, 2013.

* cited by examiner

FIG.4

MAPPING INFORMATION 105

| USER PROGRAM NAME | FIRST ADDRESS | FINAL ADDRESS |
|---|---|---|
| MAIN1 | 0x00001000 | 0x00001500 |
| MAIN2 | 0x00002000 | 0x00002500 |
| MAIN3 | 0x00003000 | 0x00003500 |
| FUNC | 0x00004000 | 0x00004200 |

FIG.5

EXECUTION ERROR INFORMATION

ERROR DETAIL

| ERROR CODE | ERROR DESCRIPTION | ERROR OCCURRENCE ADDRESS | CONTROL PROGRAM NAME |
|---|---|---|---|
| 1000 | ... | 0x00004100 | FUNC |

CONTROL PROGRAM CALLING INFORMATION AT TIME OF EXECUTION ERROR

| No. | CONTROL PROGRAM NAME | CALLING ADDRESS | INPUT DATA 1 | INPUT DATA 2 |
|---|---|---|---|---|
| 1 | MAIN1 | 0x00001100 | 10 | 20 |
| 2 | FUNC | - | - | - |
| 3 | | | | |
| 4 | | | | |

CLOSE

PROGRAMMABLE CONTROLLER, PROGRAMMABLE CONTROLLER SYSTEM, AND METHOD OF CREATING EXECUTION ERROR INFORMATION

CROSS REFERENCE TO RELATED APPLICATIONS

This application is a National Stage of International Application No. PCT/JP2013/056172 filed Mar. 6, 2013, the contents of all of which are incorporated herein by reference in their entirety.

FIELD

The present invention relates to a programmable controller, a programmable controller system, and a method of creating execution error information.

BACKGROUND

It is already known that many programmable controllers have a function of providing a user with information on an execution error of a control program when an execution error occurs. This allows the user to analyze factors behind the execution error by using the information.

For example, Patent Literature 1 discloses a method in which a CPU (central processing unit) unit generates a return address for a subroutine program as execution error information. With this method, when a subroutine program is executed, a return address for the subroutine program is stored in a stack area by executing a sequence command to store the return address for the subroutine program. When an abnormality is detected in the executing of the subroutine program, the return address for the subroutine program stored in the stack area is referred to.

Patent Literature 2 discloses a method of providing a user with execution error information. In this method, when an abnormality is detected in a function block included in a user program, an identifier for status abnormality and a status code that describes the abnormality are retained in the memory of a programmable controller. The memory of the programmable controller can be accessed externally to determine the presence of the status abnormality, the function block with the abnormality, and abnormality factors.

CITATION LIST

Patent Literature

Patent Literature 1: Japanese Patent Application Laid-Open No. 04-215106
Patent Literature 2: Japanese Patent Application Laid-Open No. 2007-304939

SUMMARY

Technical Problem

In recent years, control programs have tended to become larger in scale and thus the componentization of control programs continues. In general, a componentized control program (hereinafter referred to as a component-based control program) is a control program created for a given function and it achieves its design function on the basis of input data that is provided. Hence, a component-based control program is called by a plurality of control programs and its input data is not fixed.

When an execution error of a callee control program, which is called by such a plurality of control programs, occurs, it is difficult to analyze factors behind the execution error with the methods disclosed in Patent Literatures 1 and 2.

Specifically, in the method disclosed in Patent Literature 1, when an execution error of a component-based control program occurs, the input data for the component-based control program is not stored. In the method disclosed in Patent Literature 2, when an execution error of a component-based control program occurs, the name of the caller control program and the input data upon the call being made are not displayed. This poses a problem with a component-based control program that has been called by a plurality of control programs and whose input data is not fixed in that the analysis of factors is difficult. The method disclosed in Patent Literature 1 has another problem in that, because the information that identifies the caller control program is the return address to the control program, it is difficult to instantaneously identify the caller control program.

The present invention has been achieved in view of the above, and an objective of the invention is to provide a programmable controller, a programmable controller system, and a method of creating execution error information that makes it possible for a user to correctly and efficiently understand factors behind an execution error of a component-based control program when the execution error occurs.

Solution to Problem

The present invention is made to achieve the objective mentioned above, and is relates to a programmable controller that performs processing in accordance with a control program that includes: a control program storage unit storing a control program and a callee control program that is called by the control program; a control program execution unit executing processing in accordance with the control program in the control program storage unit; a return address storage unit storing a return address to return to after execution of the callee control program by the control program execution unit; an input data storage unit storing input data for the callee control program; a mapping information storage unit storing mapping information that associates storing positions of the control program and the callee control program in the control program storage unit with program names of the control program and the callee control program; and an execution error information management unit acquiring execution error information in a case in which an execution error of the callee control program occurs by the control program execution unit. In a case in which the callee control program is called during execution of the control program, the control program execution unit stores a return address to return to in the return address storage unit when the execution of the callee control program is finished and stores input data for the callee control program in the input data storage unit. In a case in which an execution error of the callee control program occurs, the execution error information management unit acquires the execution error information that includes the return address stored in the return address storage unit, the input data stored in the input data storage unit, and a program name that corresponds to the return address obtained by using the mapping information.

Advantageous Effects of Invention

In the present invention, a return address to be used after the execution of a callee control program and input data are stored when the callee control program is called. When an execution error of the callee control program occurs, a caller control program is identified by the return address; and the programmable controller acquires execution error information that includes the name of the caller control program, and the return address and the input data that have been stored. Thus, the information can be provided to a user. In this manner, the present invention enables the user to identify the caller control program and the input data when the execution error occurs and thereby to analyze factors behind the execution error with ease. Therefore, the present invention has an effect of achieving a reduction in the workload for the development and maintenance of a system with a component-based control program.

BRIEF DESCRIPTION OF DRAWINGS

FIG. 4 is a diagram illustrating an exemplary configuration of mapping information.

FIG. 5 is a diagram illustrating an exemplary execution error information display screen.

DESCRIPTION OF EMBODIMENTS

Preferred embodiments of a programmable controller, a programmable controller system, and a method of creating execution error information according to the present invention will be described in detail with reference to the drawings. The present invention is not limited to these embodiments.

Figure 1:
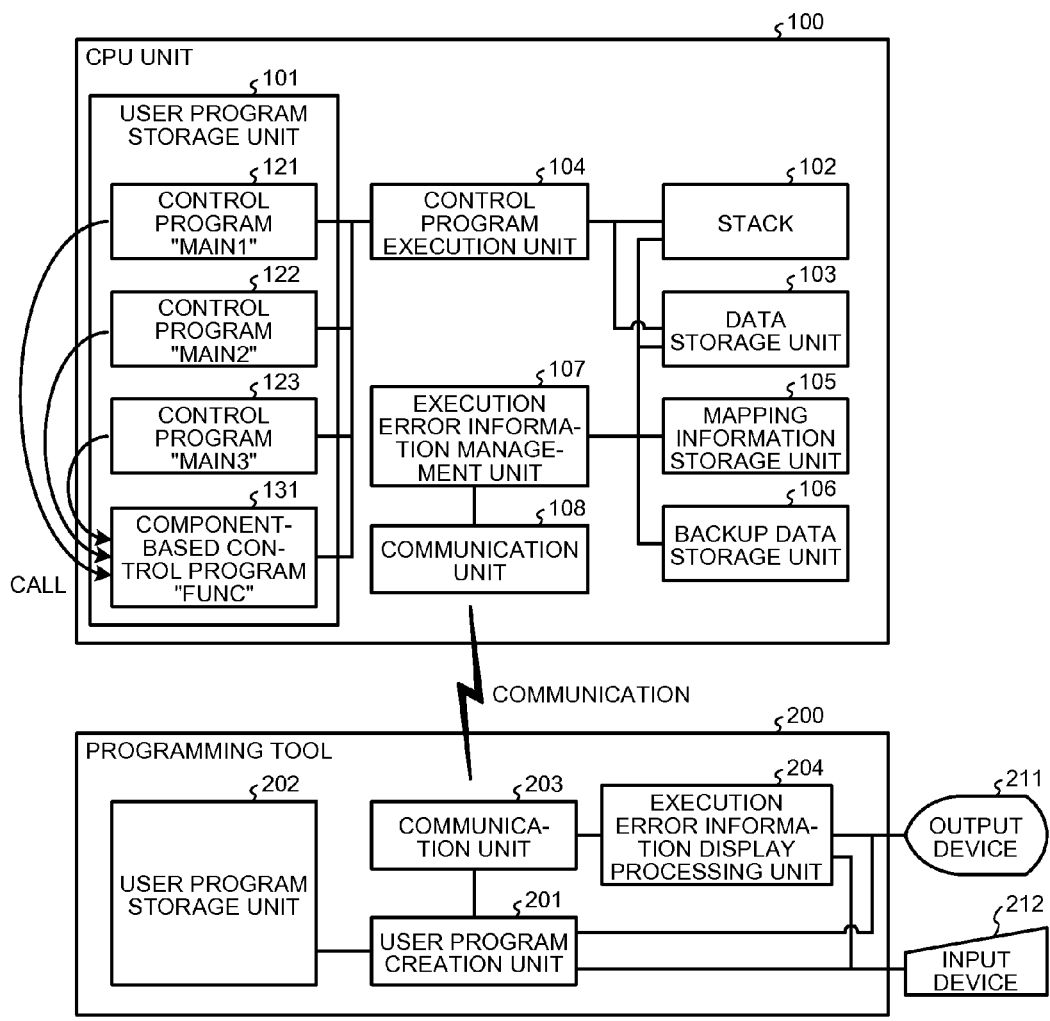
FIG. 1 is a schematic block diagram illustrating the configuration of a programmable controller system according to an embodiment.

FIG. 1 is a schematic block diagram illustrating the configuration of a programmable controller system according to an embodiment. The programmable controller system includes a CPU unit 100 and a programming tool 200 mutually connected via a communication line. The CPU unit 100 constitutes a programmable controller and executes a user program. In the programming tool 200, a user program to be executed by the programmable controller is programmed and debugged.

The CPU unit 100 includes a user program storage unit 101, which is a control program storage unit, a stack 102, which is a return address storage unit; a data storage unit 103, which is an input data storage unit; a control program execution unit 104, which is a control program execution unit; a mapping information storage unit 105, which is a mapping information storage unit; a backup data storage unit 106, which is a backup data storage unit; an execution error information management unit 107, which is an execution error information management unit; and a communication unit 108, which is a communication unit.

The user program storage unit 101 stores a user program, such as a ladder program, to be executed by the CPU unit 100. In this embodiment, the main program that is a program executed in accordance with an instruction from a user is referred to as the control program; and a subroutine program that is a program executed when called by the control program is referred to as a component-based control program. The component-based control program corresponds to a callee control program. An example will be described below in which the user program storage unit 101 stores a control program 121 named "MAIN1," a control program 122 named "MAIN2," a control program 123 named "MAIN3," and a component-based control program 131 named "FUNC." The three control programs 121 to 123 are configured to call the component-based control program 131.

Figure 2:
FIG. 2 is a diagram illustrating example data stored in a stack.

When one of the control programs calls the component-based control program, the stack 102 stores a return address indicative of the position in the control program to return to upon the completion of execution of the component-based control program. FIG. 2 is a diagram illustrating example data stored in the stack. As illustrated in the figure, the stack 102 stores a return address when the control program calls the component-based control program. The number of return addresses that can be stored in the stack 102 is set in advance by the system designer. The stored return address is deleted when the execution of the callee component-based control program is finished and the execution of the caller control program is restarted, in other words, when the return address has been read.

Figure 3:
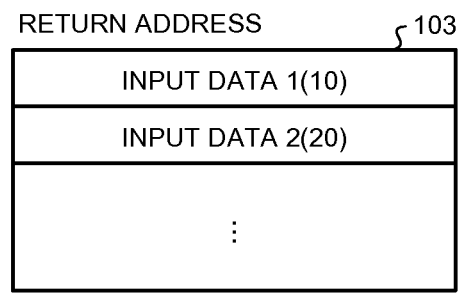
FIG. 3 is a diagram illustrating example data stored in a data storage unit.

The data storage unit 103 stores therein the input data for the callee component-based control program. FIG. 3 is a diagram illustrating example data stored in the data storage unit. As illustrated in the figure, the data storage unit 103 stores therein the input data for the component-based control program when the control program calls the component-based control program. The data stored in the data storage unit 103 is initialized at a discretionary timing. For example, the stored input data is deleted when the execution of the callee component-based control program is finished and the execution of the caller control program is restarted.

The control program execution unit 104 executes the user programs in the user program storage unit 101 and makes a call. In a case where there is a call in the control program, the control program execution unit 104 stores a return address in the stack 102, acquires from the caller control program the input data for the callee component-based control program, and stores the input data in the data storage unit 103 when the call by the control program is made.

The mapping information storage unit 105 stores mapping information that associates the storing positions (addresses) of the user programs in the user program storage unit 101 with the names of the user programs. FIG. 4 is a diagram illustrating an exemplary configuration of the mapping information. As illustrated in the figure, the mapping information includes the names of the user programs (the control programs and the component-based control program) stored in the user program storage unit 101 and the first addresses and the final addresses of the user programs, which indicate the storing positions of the user programs in the user program storage unit 101.

The execution error information management unit 107 acquires the return address stored in the stack 102 on the occurrence of an execution error of the callee component-based control program. The execution error information management unit 107 also acquires the name of the caller control program corresponding to the return address stored in the stack 102 by using the mapping information in the mapping information storage unit 105. Additionally, the execution error information management unit 107 acquires the input data for the callee control program from the data storage unit 103. The execution error information management unit 107 then stores execution error information that includes the name of the caller control program, the calling position address (return address), and the input data, which have been acquired, in the backup data storage unit 106.

In addition to the execution error information, the execution error information management unit 107 acquires error detail information that includes the name of the component-based control program being executed when the execution error occurred, the error occurrence address in the component-based control program, and an error code indicative of the error.

The backup data storage unit 106 stores the execution error information that includes the name of the caller control program, the calling position address (return address), and the input data, which have been acquired by the execution error information management unit 107. The backup data storage unit 106 may also store the error detail information. The communication unit 108 communicates with the programming tool 200. On receipt of an acquisition request for the execution data from the programming tool 200, the communication unit 108 transmits the execution error information acquired by the execution error information management unit 107 to the programming tool 200.

The programming tool 200 includes a user program creation unit 201, a user program storage unit 202, a communication unit 203, which is communication unit, and an execution error information display processing unit 204, which is an execution error information display processing unit.

The user program creation unit 201 creates a user program (a control program or a component-based control program) in accordance with the input from a user and displays a user program for the user. The user program storage unit 202 stores a user program created by the user. The user program stored in the user program storage unit 202 is stored in the user program storage unit 101 of the CPU unit 100 via the communication unit 203 in accordance with the instruction from the user. The communication unit 203 communicates with the programmable controller (the CPU unit 100).

The execution error information display processing unit 204 displays the execution error information upon the occurrence of an execution error, which is information acquired via the communication unit 203 from the CPU unit 100. The execution error information display processing unit 204 may also acquire the error detail information from the CPU unit 100 and display the error detail information in addition to the error information. FIG. 5 is a diagram illustrating an exemplary execution error information display screen. As illustrated in the figure, an execution error information display screen 300 includes an error detail information display area 310 that displays the error detail information and an execution error information display area 320 that displays the execution error information. The error detail information includes the error code that identifies the type of the error that has occurred, the description of the error that has occurred, the error occurrence address, which is the address at which the error has occurred, and the control program name that identifies the control program in which the error has occurred. The execution error information represents conditions in which the component-based control program has been called during the occurrence of an execution error and is stored in the backup data storage unit 106 of the CPU unit 100. Specifically, the execution error information includes the name of the control program in which the execution error has occurred, the calling address, and the input data.

The programming tool 200 is also provided with an output device 211, such as a liquid crystal display device; and an input device 212, such as a keyboard or a pointing device. The output device 211 displays a screen created by the user program creation unit 201 and the execution error information display processing unit 204. The input device 212 inputs necessary information to the user program creation unit 201 and the execution error information display processing unit 204.

The programming tool 200 as described above can be configured from an information processing terminal, such as a personal computer, that includes a CPU, a ROM (read only memory), a RAM (random access memory), secondary storage, a communication unit, a display unit, and an input unit.

Figure 6:
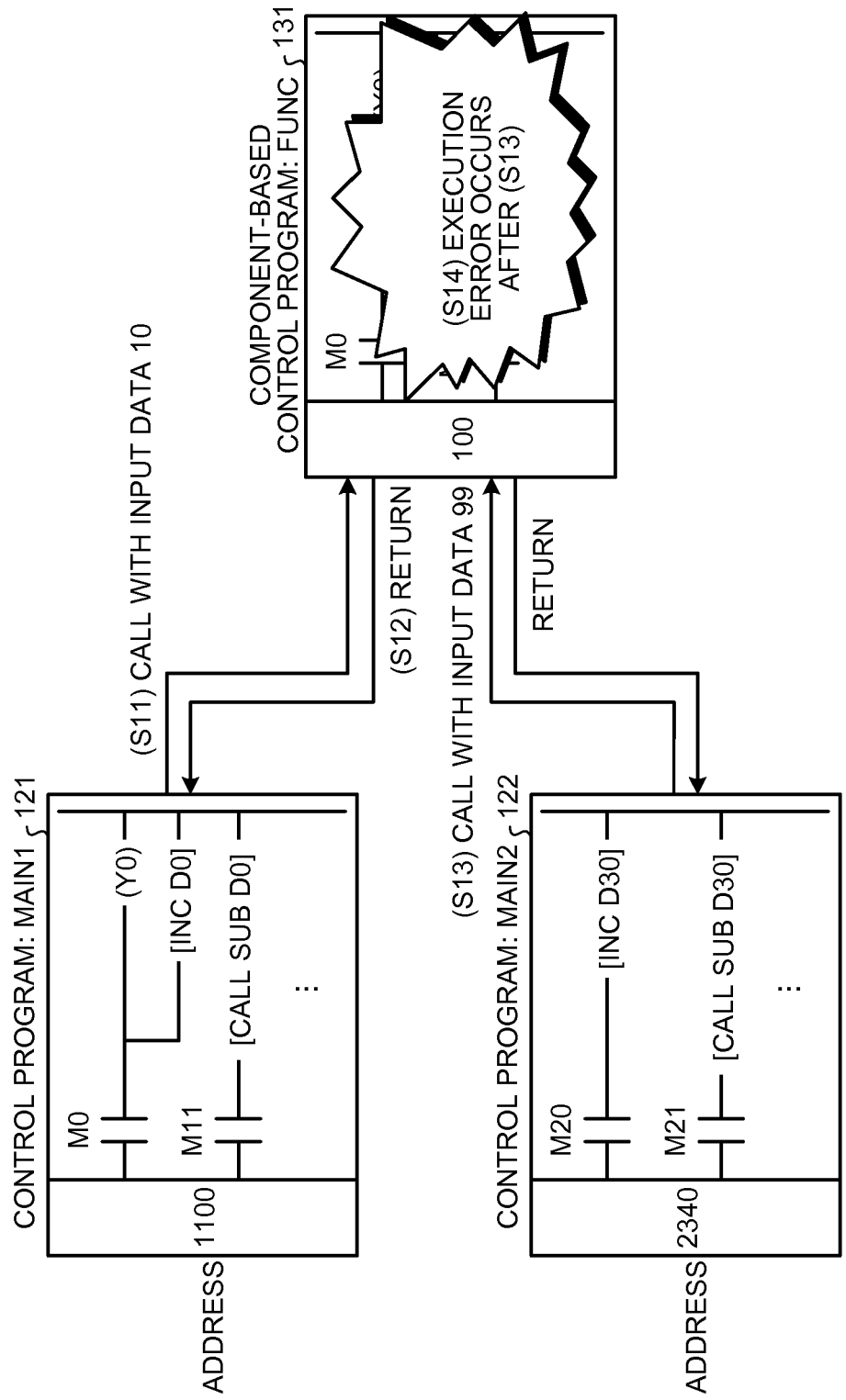
FIG. 6 is a diagram illustrating an image of the execution of user programs in a programmable controller.
Figure 7:
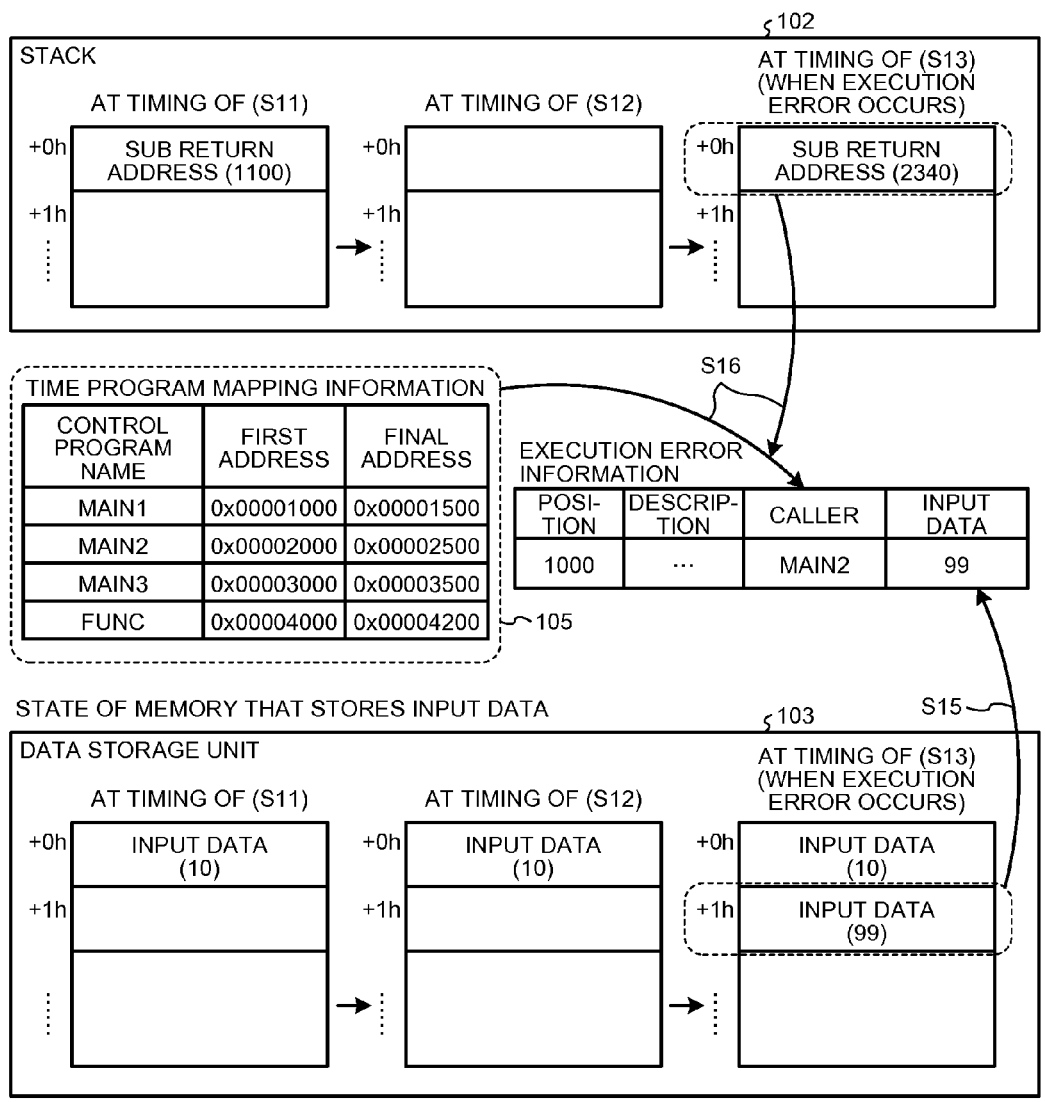
FIG. 7 is a schematic diagram illustrating the stack, the data storage unit, and execution error information during the processing illustrated in FIG. 6.

The processing performed, when an execution error occurs, by the programmable controller system having the configuration described above is described here. FIG. 6 is a diagram illustrating an image of the execution of the user programs in the programmable controller. FIG. 7 is a schematic diagram illustrating the stack, the data storage unit, and the execution error information during the processing illustrated in FIG. 6.

As illustrated in FIG. 6, in the programmable controller (the CPU unit 100), the control program execution unit 104 executes the control program (MAIN1) 121. The control program 121 has a command at an address "1100" to call the component-based control program (FUNC) 131. The command is read, and the control program execution unit 104 acquires input data "10" upon the execution of the command and calls the component-based control program 131 with the input data "10" (Step S11 in FIG. 6). When the control program 121 calls the component-based control program 131, the control program execution unit 104 stores the return address "1100" in the stack 102 and stores the input data "10" for the component-based control program 131 in the data storage unit 103 (Step S11 in FIG. 7).

The control program execution unit 104 executes the component-based control program 131 called by the control program 121 with the input data "10". The assumption here is that the component-based control program 131 finishes successfully. When the execution of the component-based control program 131 is finished, the control program execution unit 104 acquires the return address "1100" stored in the stack 102 and returns to the address "1100" in the caller control program 121 (Step S12 in FIG. 6). On acquiring the return address in the stack 102, the control program execution unit 104 deletes the corresponding return address in the stack 102 and deletes the corresponding input data in the data storage unit 103 (Step S12 in FIG. 7). The control program execution unit 104 then reads a command at the address subsequent to the return address "1100" to execute the following command in the control program 121.

After the execution of the control program 121, the control program execution unit 104 executes the control program (MAIN2) 122. The control program 122 has a command at an address "2340" to call the component-based control program (FUNC) 131. The command is read and the control program execution unit 104 acquires input data "99" upon the execution of the command and calls the component-based control program 131 with the input data "99" (Step S13 in FIG. 6). When the control program 122 calls the component-based control program 131, the control program execution unit 104 stores the return address "2340" in the stack 102 and stores the input data "99" for the component-based control program 131 in the data storage unit 103 (Step S13 in FIG. 7).

The control program execution unit 104 executes the component-based control program 131 called by the control program 122 with the input data "99". It is assumed here that an execution error occurs during the execution of the component-based control program 131 (Step S14 in FIG. 6). Upon the occurrence of the execution error of the component-based control program 131, the execution error information management unit 107 of the CPU unit 100 acquires the information on the execution error occurrence that is stored in the stack 102 and in the data storage unit 103. Here, the execution error information management unit 107 acquires the return address "2340" in the stack 102 and the input data "99" from an address corresponding to the storing position of the input data from the control program 122 in the data storage unit 103 (Step S15 in FIG. 7).

The execution error information management unit 107 also acquires the name of the caller control program when the execution error occurs by using the acquired return address on the basis of the mapping information in the mapping information storage unit 105 (Step S16 in FIG. 7). Here, the mapping information in FIG. 4 indicates that the user program that has the return address "2340" is "MAIN2." At this point, the execution error information management unit 107 also acquires the error detail information, which includes the name of the control program in which the execution error has occurred, the error occurrence address in the control program, the error code, and the description of the error.

Additionally, the execution error information management unit 107 stores the execution error information that includes the name of the control program, the return address (calling position address), and the input data, which have been acquired, in the backup data storage unit 106. The execution error information management unit 107 also stores error detail information in the backup data storage unit 106 in addition to the execution error information.

Then, when an acquisition request for the execution error information is made through the operation of the user with the programming tool 200, the execution error information display processing unit 204 transmits the execution error information acquisition request via the communication unit 203 to the execution error information management unit 107 of the CPU unit 100.

On receipt of the execution error information acquisition request, the execution error information management unit 107 of the CPU unit 100 transmits the execution error information, which includes the name of the caller control program when the execution error of the component-based control program 131 occurred, the return address (calling position address), and the input data for the call, which are acquired through the processing described above; and the error detail information that includes the name of the control program in which the execution error has occurred, the error occurrence address in the control program, the error code, and the description of the error via the communication unit 108 to the execution error information display processing unit 204 of the programming tool 200.

The execution error information display processing unit 204 of the programming tool 200, on receipt of the execution error information and the error detail information, displays the execution error information and the error detail information, which have been acquired, on the output device 211. The information is displayed on the output device 211 by using a discretionary method and may be displayed, for example, in the form as illustrated in FIG. 5. This finishes the processing to create the execution error and the processing to display the execution error.

As described above, a user is able to analyze with ease factors behind an execution error of even a component-based control program, which is called by a plurality of control programs and whose input data is not fixed, by means of displaying the name of the caller control program, the return address (calling position address), and the input data upon the call being made as the execution error information on the output device 211 when the execution error occurs. As a result, the workload for the development and maintenance of a system including a component-based control program can be reduced.

While the execution error information management unit 107 transmits the execution error information acquired when an execution error occurs upon receipt of an execution error information acquisition request in the embodiment described above, it is not limited to this configuration. For example, instead of the execution error information acquired when the execution error occurs, execution error information of the past stored in the backup data storage unit 106 may be transmitted. Furthermore, the execution error information may be displayed after the execution error is resolved.

While the programming tool 200 transmits an execution error information acquisition request to the execution error information management unit 107 of the CPU unit 100 in the embodiment described above, it is not limited to this configuration. For example, instead of the programming tool 200, a device may be provided that can communicate with the CPU unit 100, transmit the execution error information acquisition request, and display the result may perform the task.

In this embodiment, a return address and input data for a component-based control program are stored when the component-based control program is executed; and when an execution error of the component-based control program occurs, the name of the caller control program is acquired through the return address by using the mapping information that manages the storing positions of control programs in the user program storage unit 101; therefore, the execution error information that includes the name of the control program, the input data, and the return address is acquired. This can achieve the effect of providing a user swiftly with the status when the execution error of the component-based control program occurs.

Furthermore, the programming tool 200 acquires the execution error information and displays the information to a user; thus, the caller control program and the input data can be identified from the execution error information on the display even for a component-based control program that is called by a plurality of control programs and whose input data is not fixed. This allows a user to analyze factors behind an execution error with ease. As a result, an effect of achieving a reduction in the workload for the development and maintenance of a system including a component-based control program is achieved.

INDUSTRIAL APPLICABILITY

As described above, the programmable controller system according to the invention can appropriately provide the development and maintenance of a system including a component-based control program that is called by a plurality of control programs.

REFERENCE SIGNS LIST

100 CPU unit, 101,202 user program storage unit, 102 stack, 103 data storage unit, 104 control program execution unit, 105 mapping information storage unit, 106 backup data storage unit, 107 execution error information management unit, 108, 203 communication unit, 121-123 control program, 131 component-based control program, 200 programming tool, 201 user program creation unit, 204 execution error information display processing unit, 211 output device, 212 input device, 300 execution error information display screen, 310 error detail information display area, 320 execution error information display area.

The invention claimed is:

1. A programmable controller that performs processing in accordance with a control program, the programmable controller comprising:
   a control program storage unit storing
      a control program and
      a callee control program that is called by the control program;
   a control program execution unit executing processing in accordance with the control program in the control program storage unit;
   a return address storage unit
      storing a return address to return to after execution of the callee control program by the control program execution unit, and
      deleting the return address when the return address is read out by the control program execution unit after execution of the callee control program finished;
   an input data storage unit storing input data for the callee control program;
   a mapping information storage unit storing mapping information that associates storing positions of the control program and the callee control program in the control program storage unit with program names of the control program and the callee control program; and
   an execution error information management unit acquiring execution error information in a case in which an execution error of the callee control program occurs by the control program execution unit, wherein
   in a case in which the callee control program is called during execution of the control program, the control program execution unit
      stores a return address to return to in the return address storage unit when the execution of the callee control program is finished and
      stores input data for the callee control program in the input data storage unit, and
   in a case in which an execution error of the callee control program occurs, the execution error information management unit acquires the execution error information that includes
      the return address stored in the return address storage unit,
      the input data stored in the input data storage unit, and
      a program name, of which control program calls the callee control program that caused the execution error, that corresponds to the return address obtained by using the mapping information.

2. The programmable controller according to claim 1, further comprising a backup data storage unit storing the execution error information, wherein
   the execution error information management unit further has a function of backing up the execution error information in the backup data storage unit in a case in which an execution error of the callee control program occurs.

3. The programmable controller according to claim 2, wherein
   the execution error information management unit transmits the execution error information stored in the backup data storage unit to an external device in response to an acquisition request for the execution error information from the external device.

4. The programmable controller according to claim 1, wherein
   the execution error information management unit transmits the acquired execution error information to an external device in response to an acquisition request for the execution error information from the external device.

5. The programmable controller according to claim 1, wherein
   the control program execution unit initializes the input data storage unit at any arbitrary timing.

6. The programmable controller according to claim 5, wherein
   the control program execution unit initializes the input data storage unit when the execution of the callee control program is finished and the execution of the caller control program is restarted.

7. A programmable controller system, comprising:
   a programmable controller that performs processing in accordance with a control program; and
   an information processing terminal that allows the control program to be created or debugged, wherein
   the programmable controller comprises:
      a control program storage unit storing a control program and a callee control program that is called by the control program;
      a control program execution unit executing processing in accordance with the control program in the control program storage unit;
      a return address storage unit
         storing a return address to return to after execution of the callee control program by the control program execution unit, and
         deleting the return address when the return address is read out by the control program execution unit after execution of the callee control program finished;
      an input data storage unit storing input data for the callee control program;
      a mapping information storage unit storing mapping information that associates storing positions of the control program and the callee control program in the control program storage unit with program names of the control program and the callee control program;
      an execution error information management unit acquiring execution error information in a case in which an execution error of the callee control program occurs by the control program execution unit; and a communication unit communicating with the information processing terminal, the information processing terminal comprises:
a communication unit communicating with the programmable controller; and
an execution error information display processing unit issuing an acquisition request for the execution error information to the programmable controller and displaying, on a display unit, the execution error information acquired from the programmable controller,
the control program execution unit of the programmable controller, in a case in which the callee control program is called during execution of the control program,
stores a return address to return to after the execution of the callee control program is finished in the return address storage unit and
stores input data for the callee control program in the input data storage unit, and
the execution error information management unit of the programmable controller, in a case in which an execution error of the callee control program occurs,
acquires the execution error information that includes the return address stored in the return address storage unit, the input data stored in the input data storage unit, and a program name, of which control program calls the callee control program that caused the execution error, that corresponds to the return address and is obtained by using the mapping information, and
transmits, on receiving an acquisition request for the execution error information from the information processing terminal, the acquired execution error information to the information processing terminal.

8. The programmable controller system according to claim 7, wherein
the programmable controller further comprises a backup data storage unit storing the execution error information, and
the execution error information management unit of the programmable controller further has a function of backing up the execution error information in the backup data storage unit in a case in which an execution error of the callee control program occurs.

9. The programmable controller system according to claim 8, wherein,
the execution error information management unit of the programmable controller, on receiving an acquisition request for the execution error information from the information processing terminal, transmits the execution error information in the backup data storage unit to the information processing terminal.

10. A method for creating execution error information in a programmable controller that performs processing in accordance with a control program, the method comprising:
a return address storing step of, upon reading of a command in the control program to call a callee control program, storing a return address to return to after execution of the callee control program;
an input data storing step of acquiring and storing input data for the callee control program when the callee control program is called;
a callee control program executing step of executing the callee control program; and
a returning step of, upon finishing of the execution of the callee control program, returning to the return address so as to execute processing of the control program, wherein
the callee control program executing step comprises:
a first data acquiring step of, on occurrence of an execution error of the callee control program, acquiring the return address and the input data that have been stored;
a second data acquiring step of acquiring a name of the control program that corresponds to the return address on a basis of mapping information that associates storing positions of the control program and the callee control program in the control program storage unit with program names of the control program and the callee control program; and
an execution error information transmitting step of, in accordance with an instruction from an information processing terminal that is connected to the programmable controller, transmitting execution error information that includes the return address, the input data, and the name of the control program, of which control program calls the callee control program that caused the execution error, to the information processing terminal, and
the return address, which is stored at the returning address storing step, is deleted when the control program execution finishes, when returning to the return address, after the execution of the callee control program finished at the returning step.

11. The method of creating execution error information according to claim 10, wherein
the callee control program executing step further comprises a backup step of backing up the acquired execution error information.

* * * * *